United States Patent [19]

Zippe

[11] Patent Number: 4,750,705
[45] Date of Patent: Jun. 14, 1988

[54] MAGNETIC QUICK ACTION VALVE

[75] Inventor: Gernot Zippe, Frankfurt Main, Fed. Rep. of Germany

[73] Assignee: M.A.N. Technologie GmbH, Munich, Fed. Rep. of Germany

[21] Appl. No.: 835,970

[22] Filed: Mar. 4, 1986

[30] Foreign Application Priority Data

Mar. 7, 1985 [DE] Fed. Rep. of Germany ....... 3508151

[51] Int. Cl.⁴ .................... F16K 1/34; F16K 31/08; F16K 51/02
[52] U.S. Cl. ...................................... 251/65; 251/68; 251/129.15; 137/248; 137/76
[58] Field of Search ............... 251/65, 68, 129.15; 137/76, 248

[56] References Cited

U.S. PATENT DOCUMENTS

| 959,609 | 5/1910 | Roehrich | 251/70 |
| 1,292,603 | 1/1919 | Hohman | 137/76 |
| 3,212,751 | 10/1965 | Hassa | 251/65 |
| 3,447,776 | 6/1969 | Blumer | 251/65 |
| 3,716,215 | 2/1973 | Washburn et al. | 251/358 |
| 4,303,196 | 12/1981 | Raines et al. | 251/65 X |
| 4,349,042 | 9/1982 | Shimizu | 251/65 X |
| 4,392,632 | 7/1983 | Gast et al. | 251/65 |

Primary Examiner—Arnold Rosenthal
Attorney, Agent, or Firm—Roberts, Spiecens & Cohen

[57] ABSTRACT

A quick action valve for use with fluid or vacuum lines has a permanent magnet assembly for urging the valve member onto the valve seat. The valve is normally opened and is so designed that after closing it may not reopen of its own accord whatever the later changes in direction of flow or whatever the variations in pressure. The closing force is exerted by magnets. Once it has shut, the valve may only be reopened by external mechanical or magnetic action.

13 Claims, 2 Drawing Sheets

MAGNETIC QUICK ACTION VALVE

FIELD OF THE INVENTION

The invention relates to the construction of a magnetic quick action valve for use in fluid lines.

BACKGROUND

For certain applications there is the necessity of providing a simple, inexpensive and reliable quick action shut off valve which interrupts and permanently closes a gas or liquid flow or a vacuum line.

Simple flow-actuated valves with valve members in the form of plates, balls or cones adapted to be closed by counter pressure, or by mechanical and/or electromagnetic forces, are known, for example, in German Pat. No. 2,638,879. These valves operate in such a way that they open when the fluid pressure increases above or falls below a certain value and then close again or vice versa.

There are furthermore applications, as for example, safety valves in the piping of toxic gases, in which the valve has to close when a defect occurs in order to prevent escape of the gas into the ambient atmosphere or, in another case, to prevent damage to vacuum apparatus by the ingress of air. In such cases, steps have to be taken to ensure that the defect does not entail undesired secondary effects.

SUMMARY OF THE INVENTION

One object of the present invention is to provide a valve for preventing such effects which is simple to manufacture and is reliable from the industrial safety point.

In order to achieve this and further objects the present invention provides a quick action valve for sealing off a duct for a fluid, that is to say for the transport of a fluid or for vacuum, having permanent magnet means for exerting a force on the valve seat, the valve being so designed that after closing operation the valve remains so sealed that, whatever the direction of the flow in the duct and whatever changes in pressure later, it is not possible for the valve to reopen of its own accord.

Using simple means, the valve enables the closure of a gas or liquid duct or a vacuum duct to be reliably initiated and for the duct to be sealed off by magnets of known design having a suitable form and strength. Accordingly the apparatus is brought into and maintained in a safe condition. Sensitive devices operating in high vacuum, or for example pumps and indicators are thus safeguarded against the incress of air or against other contamination.

Additional electromagnetic and/or mechanical means may be used to reopen the valve and hold it open when needed. The sealing effect of the valves, once closed, does not need any additional means to maintain the sealing effect.

Dependent on the degree of sealing effect required of the valve when shut, as for example as a seal between high vacuum and the atmosphere or only to shut off a water pipe, and dependent on the size of the diameter of the duct or ducts or the nature of the flowing medium, appropriate sealing means are to be provided, which are pressed into engagement by the above-noted, permanent magnet forces. In this respect, known sealing materials may be used providing they withstand the forces acting on them.

It is not in all cases that elastic and rubber-like seals will suffice to provide a permanent sealing of the duct once it has been shut off. It is more especially in the case of aggressive media that specially designed seal faces (for example using Teflon ®) have to be employed that are unelastic, but so far have been subject to creep under the force pressing the seal faces together so that a leak may develop. This is prevented by the invention, on the one hand, by the magnetic forces (of attraction) acting at the valve seat and, on the other hand, by using sealing rings or seats which have sealing compounds (such as viscous oils or greases) in pores or channels which are open towards the seal faces or at any rate are opened when the valve closes. Such sealing compositions must, for example, have a low enough vapor pressure if used in high vacuum in order not to evaporate during the working life of the valve or not to contaminate the ducts or they have to withstand aggressive media with which the valve is used.

In certain cases it may prove expedient to select a sealing composition after, closing of the valve, adheres to the valve seat or becomes firmly bonded thereto as a result of a chemical reaction.

In accordance with a further embodiment of the invention, use is made of a knife edge, which after closing of the valve is acted on by the force of the magnets (producing an attracting effect) on the sealing surfaces and becomes soldered, welded or fused onto the valve seat after brief heating. This step, which ensures a permanent sealing action owing the brief heating of the sealing edge to the fusion temperature of the suitably formed valve seat, which is not to be such that on flowing it retreats from the edge, may for example be externally induced by thermal contact, as produced by an RF or other heating coil, which may be permanently incorporated in the valve.

The invention will now be described in more detail with reference to the accompanying drawings showing five different embodiments thereof.

BRIEF DESCRIPTION OF THE SEVERAL FIGURES OF THE DRAWING

DETAILED DESCRIPTION OF WORKING EXAMPLES OF THE INVENTION

Figure 1:
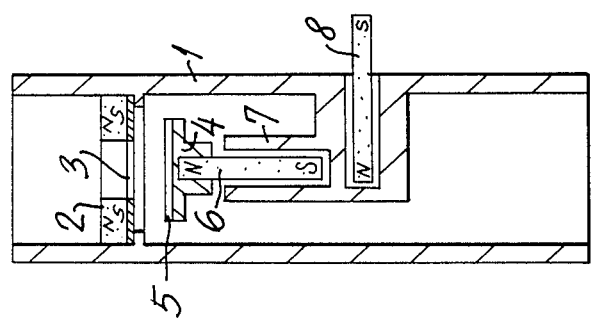
FIG. 1 shows a first working example of the invention in the form of a simple valve which, after quick action closure, is not able to be reopened without opening the pipe in some way and the insertion of a tool from the outside.

As shown in FIG. 1 a simple quick action normally open valve is placed in a fluid line of which only a short part is shown. In a housing 1 of the valve there is a fixedly mounted an annular magnet 2 with a thin seat 3 or sealing layer which is opposite a lower valve body or jumper 4 with a washer 5. The valve jumper 4 is made of ferromagnetic material and a rod magnet 6 is permanently joined thereto. In the opened condition of the valve, the rod magnet 6 (which slides in a sleeve 7) is held by a rod magnet 8 at a distance from the annular magnet 2.

By pulling out the rod magnet 8, or by reversing its magnetization, the valve may be rapidly shut. The rod magnet 8 is mounted in a hole in the housing 1 whose interior is sealed off from the interior of the pipe. This rapid closing of the valve takes place because the opposite poles of the magnets 2 and 4 attract each other and magnetically adhere to each other. Modern magnet materials such as cobalt samarium alloys offer a wide range of choice as regards matching the forces of the magnets 2, 4 and 8 in relation to each other.

Figure 2:
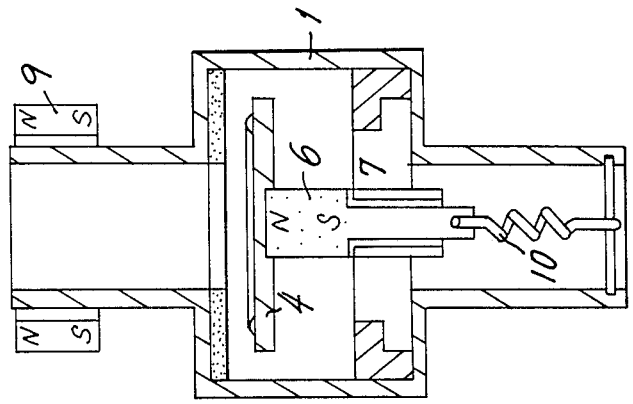
FIG. 2 shows a second embodiment of the invention in the form of a simple quick action, normally open, valve which may be reopened, without disconnecting the pipe, from the outside.

In the example of FIG. 2 a valve is placed in a fluid pipe (which may be a vacuum pipe). The housing 1 of the valve is made of non-magnetic material, at least at the magnet end. Quick action closure is brought about by the annular magnet 9.

The annular magnet 9, which in the opened condition of the valve, is at a sufficiently large distance from the valve housing, is moved into a position in which it is directly adjacent to the valve housing to close the valve. The ferromagnetic valve jumper 4, possibly supported by the rod magnet 6 running in the sleeve 7, is pressed against the sealing layer 5 and held thereon. The central guide of the valve is located in a perforated disk or spider which allows the fluid to flow therethrough. In the opened position of the valve, the valve jumper 4 with the rod magnet 5 is drawn away from the sealing layer or seat 5 by a spring 10. This means that the valve is not only capable of operating at any angle but furthermore that it may be reopened without disconnecting the pipe: it is only necessary to move the annular magnet 9, which may be in the form of a split ring, away from the housing 1. The annular magnet 9 may furthermaore have a solenoid to assist it or it may be replaced by a solenoid.

Figure 4:
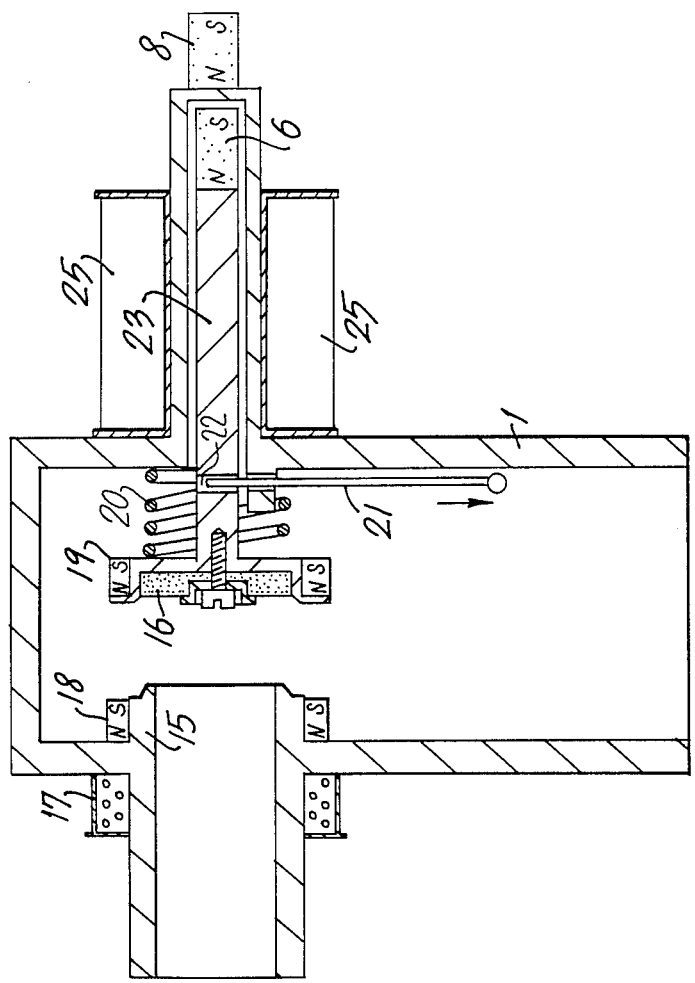
FIGS. 3 and 4 show details of sealing layers that may be used in the valves of FIGS. 1 and 2.
Figure 3:
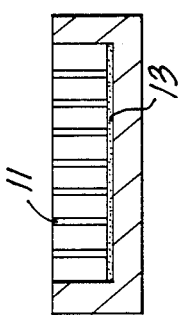

FIGS. 3 and 4 show examples of valve seals as may be conveniently used in the quick action closing valves of FIGS. 1 and 2 in order to ensure a sufficient sealing action despite the fact that the surface or contact pressures are limited by the use of magnetic force. The sealing layers may be used both on the valve jumper (i.e. as a washer) and on the valve seat. The opposite member may be made flat or beaded or it may be conical or spherical.

FIG. 3 shows a sealing disk (or sealing ring) with pores or channels 11 which are filled with suitable sealing materials and open towards the opposite member.

FIG. 4 shows a sealing disk (or sealing ring), whose channels 12 are only opened (on closing the valve) by the pressure of the sealing composition 13 which is on the side facing away from the opposite member.

Figure 5:
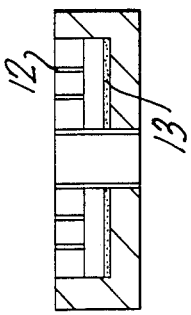
FIG. 5 shows a third working example of the invention in the form of a corner valve, whose valve seat has been fused after quick action closure.

FIG. 5 shows a corner valve in which a knife edge 15 is pressed into a sealing layer 16 when quick action closure takes place. The sealing layer is then systematically heated to a certain degree with the aid of coil 17 and is so fused.

During the closing operation, the annular magnets 18 and 19 serve to ensure that the knife edge and the layer of sealing material are in firm engagement. The spring 20 may further enhance this effect and at the start of the closing operation, when the effective magnetic forces are still weak due to their large spacing, the spring serves to ensure a rapid start of the closing stroke. On the other hand the magnets develop the greatest attraction when the force of the spring has become less.

The means in the valve housing 1 for keeping the valve in the open condition may, for example, be a simple rod 21, which for quick closure of the valve is removed from the hole 22 in the shank 23 of the valve.

A further possible means for keeping the valve open is disposed outside the housing 1 and utilizes the attraction of the magnet 6, which is firmly joined to the valve shank 23 and the magnet 8 placed outside the housing. For quick closure, it is possible, for example, to remove the magnet 8 or to override it by the use of a solenoid 25 so that the valve shank is released.

What is claimed is:

1. A closure valve having an initially open position installable in a fluid conducting conduit for rapid closure of the conduit to fluid flow, said valve comprising:
    a valve housing having a valve seat,
    a closure member facing said valve seat,
    means acting on said closure member to hold the same initially open in spaced relation from said valve seat,
    closing means including permanent magnets for urging the closure member to move from the open position to a closed position and press the closure member against the valve seat in said closed position,
    sealing means operatively associated with said valve seat and said closure member for establishing a permanent sealed connection between the closure member and the valve seat with the closure member in closed position, thereby to oppose any future re-opening of the valve,
    said closing means comprising a first permanent magnet associated with said valve seat and a second permanent magnet associated with said closure member producing attraction forces urging the closure member towards the valve seat,
    said sealing means comprising a sealant which joins said closure member and said valve seat only after the closure member is closed and seated on the valve seat, and
    means actuable externally of the valve housing for initiating the closure of the valve by counteracting the effect of the means which initially holds the closure member open.

2. A closure valve as claimed in claim 1 wherein said closing means further comprises a spring acting on said closure member.

3. A closure valve as claimed in claim 1 wherein said sealant is a fluid, one of said valve seat and closure member including a ring having channels containing said fluid, said fluid being forced out of said channels when the closure member is pressed against the valve seat to form a seal therewith.

4. A closure valve as claimed in claim 3 wherein said fluid is magnetic.

5. A closure valve as claimed in claim 3 wherein said fluid is a viscous sealing composition.

6. A closure valve as claimed in claim 5 wherein said viscous sealing composition is an adhesive.

7. A closure valve as claimed in claim 1 wherein said sealant is solder material carried by said closure member, said valve further comprising heating means for heating the solder material after the closure member is in closed position to melt the solder material and solder the closure member to the valve seat.

8. A closure valve as claimed in claim 1 wherein said means which holds the closure member initially open comprises a mechanical element.

9. A closure valve as claimed in claim 1 wherein said means which holds the closure member initially open comprises a permanent magnet.

10. A closure valve as claimed in claim 1 wherein said first permanent magnet is separable from said seat.

11. A closure valve as claimed in claim 1 wherein said closure member includes a stem, said means for initially holding the closure member open including a third permanent magnet mounted on said stem, and a fourth permanent magnet mounted externally of the housing and of a polarity to hold the closure member away from the valve seat.

12. A closure valve as claime in claim 11 wherein said fourth permanent magnet is removable from the housing to eliminate to magnetic force holding the closure member away from the valve seat and is replaceable in reverse position to produce magnetic repulsive forces to move the closure member against the valve seat.

13. A closure valve as claimed in claim 11 wherein said means for initiating closure of the valve comprises solenoid means on said housing operatively positioned relative to said closure member to produce magnetic forces to overcome the magnetic force developed by the third and fourth permanent magnets.

* * * * *